(12) United States Patent
Ancora et al.

(10) Patent No.: US 8,891,495 B2
(45) Date of Patent: Nov. 18, 2014

(54) PROCESS FOR SLOT SYNCHRONIZATION OF THE P-SCH SEQUENCE IN A UMTS COMMUNICATION SYSTEM AND A RECEIVER FOR THE SAME

(75) Inventors: Andrea Ancora, Nice (FR); Fabrizio Tomatis, Saint Laurent du Var (FR)

(73) Assignee: ST-Ericsson SA, Plan-les-Ouates (CH)

( * ) Notice: Subject to any disclaimer, the term of this patent is extended or adjusted under 35 U.S.C. 154(b) by 405 days.

(21) Appl. No.: 13/512,482

(22) PCT Filed: Nov. 29, 2010

(86) PCT No.: PCT/EP2010/007226
§ 371 (c)(1),
(2), (4) Date: Aug. 10, 2012

(87) PCT Pub. No.: WO2011/063984
PCT Pub. Date: Jun. 3, 2011

(65) Prior Publication Data
US 2012/0300755 A1 Nov. 29, 2012

(30) Foreign Application Priority Data
Nov. 30, 2009 (EP) .................................... 09368047

(51) Int. Cl.
*H04L 12/26* (2006.01)
*H04B 1/7083* (2011.01)
*H04B 1/7075* (2011.01)
*H04W 56/00* (2009.01)

(52) U.S. Cl.
CPC ............. *H04B 1/7083* (2013.01); *H04W 56/00* (2013.01); *H04B 1/70755* (2013.01)
USPC .......................................................... 370/336

(58) Field of Classification Search
CPC ............. H04B 1/70735; H04B 1/7073; H04B 1/70755; H04B 1/7117; H04B 1/7087; H04W 56/00; H04W 74/04
USPC .......... 370/335, 336, 342, 320, 310, 331, 441
See application file for complete search history.

(56) References Cited

U.S. PATENT DOCUMENTS

2002/0041580 A1* 4/2002 Shoji et al. .................... 370/335
2002/0048315 A1* 4/2002 Hanada et al. ................ 375/145
2003/0236098 A1* 12/2003 Hayoun ........................ 455/500
2010/0142657 A1* 6/2010 Alliot et al. ................... 375/343
2012/0300755 A1* 11/2012 Ancora et al. ................ 370/336

FOREIGN PATENT DOCUMENTS

EP          1184995 A2    3/2002
WO       2004073321 A2    8/2004
WO       2007051157 A2    5/2007

* cited by examiner

*Primary Examiner* — Raj Jain
(74) *Attorney, Agent, or Firm* — Coats & Bennett P.L.L.C.

(57) ABSTRACT

A Process for achieving slot synchronization of the P-SCH sequence in a UMTS communication system, involving the step of receiving (41) said signal including a synchronization sequence (P-SCH); performing a correlation (42) of each received sample with a known synchronization sequence (P-SCH) in order to generate a correlation profile; determining (43) the level of noise and computing a first threshold; suppressing (44) any peaks within said correlation profile having a magnitude inferior to said first threshold; detecting (45) the persistent local maximum peaks over a period of N slots; applying a predetermined mask positioned with respect to said persistent peaks and associated to at least one second threshold value distinctive from said first threshold.

15 Claims, 3 Drawing Sheets

PROCESS FOR SLOT SYNCHRONIZATION OF THE P-SCH SEQUENCE IN A UMTS COMMUNICATION SYSTEM AND A RECEIVER FOR THE SAME

TECHNICAL FIELD

The invention relates to the field of Third Generation (3G) wireless communications and more particularly to a process for slot synchronization of the P-SCH sequence in a UMTS communication system, and a receiver for doing the same.

BACKGROUND ART

In third generation (3G) mobile systems, such as W-CDMA, the downlink communication is based on a pseudonoise or scrambling code characterizing the different possible base stations. For the purpose of initiating any communication with a base station, any mobile station has to perform a so-called Cell search procedure for the purpose of searching for a cell and synchronising to its scrambling code.

The cell search is based on the use of three downlink channels transmitted by any base station, that is to say a Primary Synchronization Channel (P-SCH) a Secondary Synchronization Channel (S-SCH) and a Common Pilot Channel (CPICH). The P-SCH and the S-SCH channels are referred as the Synchronization channels.

Document, "*Correlation properties of W-CDMA synchronization codes*", by Igor S. Simic and V. Popovic , recalls the structure of synchronization channel as well as the Cell search procedure which is based on the three following steps:

1) Slot synchronisation;
2) Frame synchronisation and code-group identification of the base station;
3) Scrambling-code identification.

The first step of the cell search procedure achieves slot synchronisation of the mobile station to the strongest base station based on the use of the primary SCH signal.

The second step of the cell search procedure is based on the use of the secondary SCH to find frame synchronisation and identify the code group of the base station found in the first step.

In the third step, the mobile determines the scrambling code used by the found base station, which is identified through correlation over the CPICH with all scrambling codes within the code group identified in the second step.

It should be noticed the second and third steps are particularly energy consuming and consequently, the occurrence of false detection in a mobile which is powered by a battery shows critical impact on the life of the battery.

As mentioned above, during the first step of the cell search procedure the mobile station uses the primary SCH to acquire slot synchronization. UMTS Primary Synchronization Channel (P-SCH, see in particular 3GPP TS 25.211, "*Physical channels and mapping of transport channels onto physical channels (FDD)*", v. 5.8.0, January 2005) uses Golay codes for their interesting correlation properties in case of frequency offset being the aim of this control channel to ensure User-Equipment (UE) coarse time and frequency synchronization (i.e. to acquire the slot timing and to acquire the carrier frequency within the range of [1 KHz, 15 KHz]).

Unfortunately, as a drawback, the Golay correlation shape has important side-lobes that, in particular in good channel conditions (line-of-sight or unloaded cell), can grow far above the noise floor.

Typical P-SCH detection algorithms make use of the cascade of:

1) Golay filtering and accumulation step, a procedure computing the correlation of the received signal with respect to known Golay code for all chip timing within a UMTS slot (2560 chips)
2) Constant-False-Alarm-Rate (CFAR) selection, a procedure consisting in applying to the correlation values a threshold function of the estimate of the noise variance and of a target False-Alarm-Rate (FAR).

As a consequence, there clearly exists a trade-off between the noise selectivity (low FAR) and the P-SCH signal detection probability: the least the false alarms due to noise peaks, the least the true P-SCH peaks detection probability is.

The combination of these two sources of un-wanted detections (Golay side-lobes and noise peaks) can result in a large amount of detections—possibly including false detection—that need to be further processed by the common UMTS cell-search and synchronization physical procedure consisting in:

Secondary-Synchronization channel, to acquire scrambling code group.

A Scrambling Code Search based on Common Pilot Channel (CPICH), to determine which primary scrambling code within the group is in use for searched cell.

A path detection based on CPICH, to determine the most relevant timing of wireless multi-path channel profile.

As P-SCH detection procedure triggers of these successive searches, it is evident that false-alarms constitute the cause of energy waste especially for idle-mode UE operations and result in a considerable shortening of battery life.

It should be further noticed that the cell search procedures need to be considered not only during the initial cell search but also during searched in idle mode which is required for the purpose of continuously updating the list of the cells located in the neighborhood of the serving cells, and possibly useful for a handover.

In such a context, there is a strong desire to reduce the overall quantity of false alarms while keeping the probability of detection of true P-SCH peaks within a given confidence level.

SUMMARY OF THE INVENTION

It is an object of the present invention to provide a process for reducing the overall quantity of false alarms occurring during the first step of the cell search procedure for a UMTS network.

It is another object of the present invention to provide an improved P-SCH detection process for a mobile station powered by battery and thus improving the life to duration of said battery.

It is a further object of the present invention to provide a UMTS receiver which makes easier the slot synchronization by means of more sophisticated elimination of auto-correlation side lobes.

These and other objects of the invention are achieved by means of a process for achieving slot synchronization of the P-SCH sequence in a UMTS communication system, involving the step of:

receiving said signal including a synchronization sequence (PSCH);

performing a correlation of each received sample with a known synchronization sequence (P-SCH) in order to generate a correlation profile;

determining the level of noise and computing a first threshold;

suppressing any peaks within said correlation profile having a magnitude inferior to said first threshold;

detecting the persistent local maximum peaks over a period of N slots;

applying a predetermined mask positioned with respect to said persistent peaks and associated to at least one second threshold value distinctive from said first threshold.

Thresholds based on a predetermined mask are applied to the persistent peaks not being local maximum peaks. The power thresholds are used to decide whether the peaks are to be discarded or not depending on their timing and power.

The invention also provides a receiver for a UMTS network which comprises:

means for receiving said signal including a synchronization sequence (PSCH);

means for performing a correlation (of each received sample with a known synchronization sequence (P-SCH) in order to generate a correlation profile;

means for determining the level of noise and computing a first threshold;

means for suppressing any peaks within said correlation profile having a magnitude inferior to said first threshold;

means for detecting the persistent local maximum peaks over a period of N slots;

means for applying a predetermined mask positioned with respect to said persistent peaks and associated to at least one second threshold value distinctive from said first threshold.

DESCRIPTION OF THE DRAWINGS

Other features of one or more embodiments of the invention will best understood by reference to the following detailed description when read in conjunction with the accompanying drawings.

DESCRIPTION OF THE PREFERRED EMBODIMENT

Figure 1:
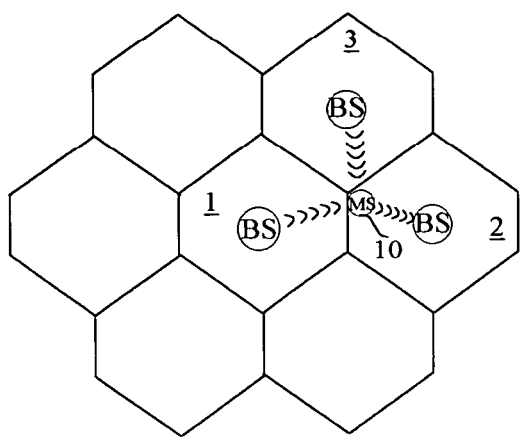
FIG. 1 recalls the topography of a cellular network comprising a mobile station and different base stations.

FIG. 1 illustrates the cell search procedure in an UMTS cellular network, represented with cells 1, 2 and 3, each comprising a base station wherein one mobile station 10 is likely to move.

Figure 2:
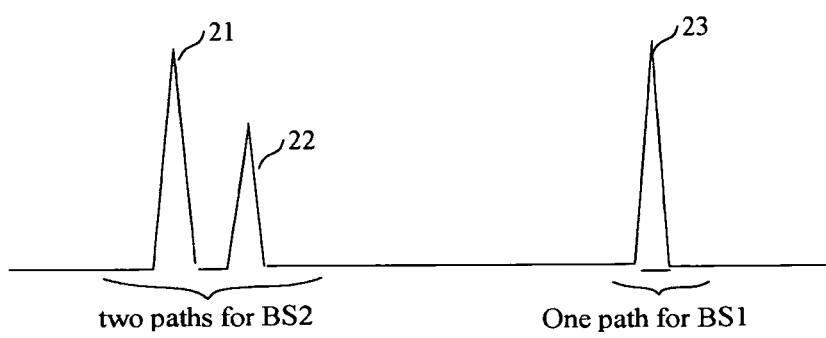
FIG. 2 illustrates the P-SCH sequence search in case of two base stations.

Since all base stations transmits the same P-SCH sequence, the correlation process performed within mobile station 10 results in the overlapping of the sequences generated by different base stations, such as illustrated in FIG. 2 which shows two paths 21 and 22 of base station of cell 2, then followed by one path of base station of cell 1.

In addition, the P-SCH correlation process, due to the non-perfect auto-correlation properties of the Golay codes, results on a correlation peak plus a number of auto-correlation side lobes.

Autocorrelation side lobes and multipath significantly increases the occurrence of false detection of the P-SCH sequences, thus increasing the consumption of energy of the mobile station, when powered by a battery.

It has been discovered by the inventors that applying a predetermined mask on the correlation detection is likely to significantly reduce the number of false detection, thus increasing the life of the battery.

Figure 3:
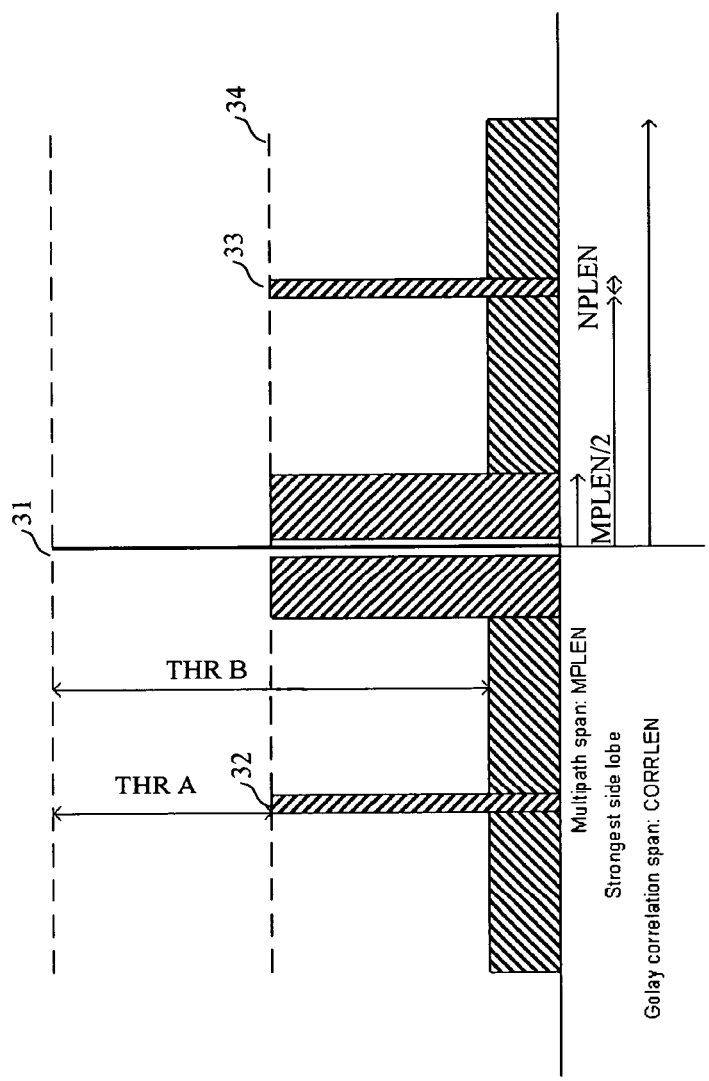
FIG. 3 illustrates one embodiment of a predetermined mask based on auto-correlation profile used for eliminating possible false detections.

With respect to FIG. 3, there is illustrated one embodiment of a mask which may be used for significantly reducing the number of false correlation peaks. In particularly, it can be seen the mask comprises, around one centered peak 31, two equidistant major side lobes 32 and 33 which can be eliminated by applying one particularly threshold value. In an illustrative and non limitative example, a value of 2-4 dB below the magnitude of the maximum peak 31 can be considered.

Figure 4:
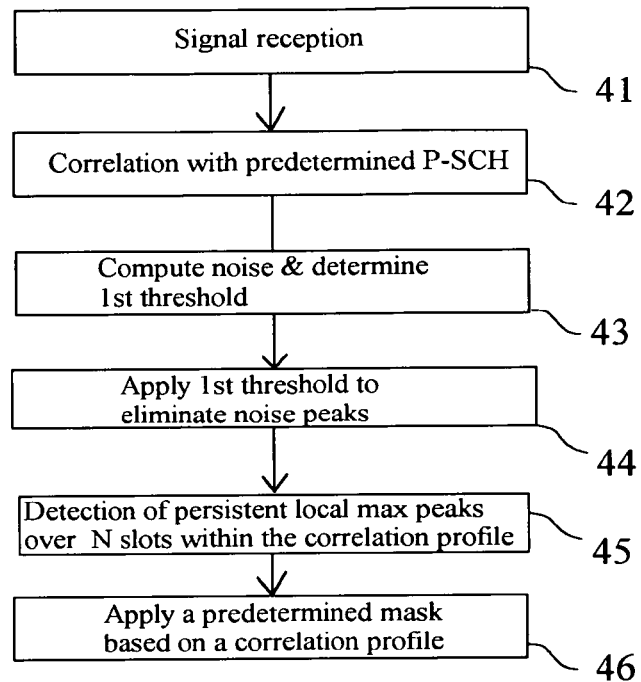
FIG. 4 illustrates one embodiment of the process according to the invention.

With respect to FIG. 4, there is now illustrated one embodiment of a process which can be used for achieving slot synchronization of the received signal.

In a step 41, the process performs the reception of the signal reception in accordance with any conventional method used for processing the signal received by one antenna coupled to a RF receiver. It should be noticed that, as known by the skilled man, the P-SCH sequence is an uncoded signal which is superposed to the CDMA signal.

In a step 42, the process proceeds with the correlation of each sample being received with the known P-SCH also called Golay type sequence since such sequence is common to all base stations composing the UMTS network. Such correlation results in the generation of a correlation profile such as illustrated in FIG. 2.

Then, in a step 43, the process proceeds to the determination of the level of the noise based on conventional techniques, such as signal power averaging etc. This estimation of the noise is used to derive a first threshold.

Then, in a step 44, the process applies the first threshold which was determined in step 43 in order to eliminate a first serie of false alarms, ie peaks having a magnitude inferior to said threshold;

Then, in a step 45, the process proceeds with the detection, within the correlation profile, of the persistent local maximum peaks over a serie of N slots.

Practically, one peak is considered to be persistent within N subsequent slots when one peaks occurs at a given time—or time window—within the N consecutive slots. Furthermore, one persistent peak is considered to be a local maximum one if it appears to be the maximum magnitude within one predefined time window which, in one particular embodiment, corresponds to a Golay correlation span of about 512 chips (e.g. 512 chips+MPLEN chips, with MPLEN having a value of a few chips).

Step 45 results in the fact that only peak 31 be considered as a local maximum within the Golay correlation span of about 512 chips. This results in the fact that one local maximum is assumed to be at a sufficient distance from the full maxima present in one slot. Practically a local maximum should be at least 512 half chips from any other local maximum ... (1/3.84 Mhz=260 nanosecondes)

Then, the process proceeds with a step 46, wherein it applies a predetermined mask based on a correlation profile, and associated with at least one second threshold distinct from the first threshold, so as to eliminate any peaks inferior to said second threshold.

In one embodiment the mask includes a first window centered around the local maximum and having a width equal to a value MPLEN half.

Furthermore, the mask includes two stripes being symmetrically spaced apart from said local maximum, at a distance of about 254 half chip, and being about NPLEN half chip wide.

In one embodiment, the second threshold is set so as to correspond to a level being about THR_A dB for the first window as well as the two stripes. Preferably, everywhere else, a third threshold set to a value of THR_B dB below the magnitude of the local maximum is used as shown in the FIG. 3.

For the sake of illustration, the values of MPLEN, NPLEN, THR A and THR B may be respectively set to 32 half chips, 4 half chips, 2 dB and 4 dB. However, such values are only indicated by way of example and can be changed by the skilled man in accordance with the particular application being considered.

In one particular embodiment, the second threshold varies in accordance with the distance to the local maximum.

It appears that the process which was described above has the result of eliminating a significant amount of side lobes which would have resulted in a waste of energy since those side lobes correspond to autocorrelation side lobes.

Such is the case of side lobes 32 and 33 shown in FIG. 3 which are spaced apart from local maximum 31 at a distance of about 254 half chips.

It can be seen that the embodiment described applies both double detection for noise peaks removal (2.1.) together with a specific side-lobes removal.

2.1. Double Detection for Noise Peaks Removal.

Each P-SCH searcher correlation operation can result in an unknown maximum number of found peaks including both true SCH signal and noise peaks.

By brute force approach, a dedicated S-SCH procedure should be performed for each found peak and the overall procedure duration can trespass the timing requirements and require a high computational power.

Nevertheless, simulation of realistic noisy fading channel shows that:

1) SCH signal peaks detections most likely occur in bursts: depending on the fading profile, detection events are successive.

2) SCH signal peaks are "persistent" at a given time index and the corresponding hit count increase when the SCH signal is out of fading dips;

3) Noise peaks detections are most likely not occurring at the same time index of consecutive runs.

Independently of fading, noise peaks hit all the time indexes uniformly.

These properties can be usefully exploited when the P-SCH measurements periodicity is lower than timing drift induced by the frequency offset.

Combining two successive P-SCH measurement results by counting peak occurrences hitting the same time indexes, allows the triggering of S-SCH step on those time-indexes that are most likely containing SCH signal.

2.2. Side-Lobes Removal.

Golay correlation shape has very strong side-lobes that spread +/−512 half chips around the real peak position.

In good channel conditions, especially in line-of-sight and un-loaded cell case, these side-lobes can raise well above the noise threshold and result in signaling the existence of false P-SCH correlation peaks.

Moreover, in case of multi-path, secondary paths could originate as well many side-lobes if their relative power is comparable to the main peak power.

In order to reduce the searcher operation bargain and avoid the S-SCH processing of these false detections, the removal of side-lobes is needed.

This side-lobes removal operation can be done by a procedure consisting of two steps:

1) P-SCH results are sorted by descending power as HW delivers detected peaks ordered by their relative timing.

2) The sorted peaks are processed applying a selection mask, as presented in the figure embedded in this section, where the mask is applied around the strongest peaks to select or not the weaker peaks.

The masking operation consists in identifying close positions to the strong peaks and monitoring their relative power. Depending on a threshold, the peak survives the selection or it is discarded.

Two threshold values THR_A and THR_B are used depending on the relative position to the local maximum to discriminate between the two main classes of side-lobes. The values of the thresholds presented in figure correspond to the static case (i.e. when the UE is not moving and the channel propagation conditions are not changing within several seconds). In case of detection of dynamic case (via speed estimation for example), the threshold values can change to optimize the cell detection.

The invention claimed is:

1. A method for achieving slot synchronization of a Primary Synchronization Channel (P-SCH) sequence in a Universal Mobile Telecommunications System (UMTS) communication system, comprising:
receiving a P-SCH signal including a synchronization sequence;
performing a correlation of each received sample in the P-SCH signal with a known P-SCH synchronization sequence in order to generate a correlation profile;
determining a level of noise of the correlation profile, and computing a first threshold for the correlation profile;
suppressing any peaks within said correlation profile having a magnitude less than the first threshold;
detecting persistent local maximum peaks over a period of N slots; and
applying a predetermined mask positioned with respect to said persistent peaks and associated with at least one second threshold value distinctive from said first threshold, to eliminate any peaks that are less than the second threshold.

2. The method of claim 1, wherein the persistent local maxima are spaced apart by at least 512 chips.

3. The method of claim 2, wherein one local maximum is spaced apart at a predefined distance from the full maxima present in one slot, and is spaced apart by at least 512 half chips from any local maximum.

4. The method of claim 1, wherein the mask includes a first window centered around a corresponding one of the local maximum peaks and having a width equal to about 32 half chips.

5. The method of claim 1, wherein the mask includes two stripes being symmetrically spaced apart from said corresponding local maximum peak, at a distance of about 254 half chips, and being about 4 half chips wide.

6. The method of claim 1, wherein the second threshold is set to a value of 2 dB to 4 dB below the magnitude of the local maximum.

7. A receiver for a Universal Mobile Telecommunications System (UMTS) network comprising means for achieving slot synchronization of the Primary Synchronization Channel (P-SCH) sequence of the UMTS network, said receiver being configured to:
receive a P-SCH signal including a synchronization sequence;

perform a correlation of each received sample in the P-SCH signal with a known synchronization sequence in order to generate a correlation profile;

determine a level of noise of the correlation profile and compute a first threshold for the correlation profile;

suppress any peaks within said correlation profile having a magnitude less than the first threshold;

detect the persistent local maximum peaks over a period of N slots; and apply a predetermined mask positioned with respect to said persistent peaks and associated with at least one second threshold value distinctive from said first threshold, to eliminate any peaks that are less than the second threshold.

8. The receiver of claim 7, wherein the persistent local maxima are spaced apart by at least 512 chips.

9. The receiver of claim 8, wherein one local maximum is spaced apart at a predefined distance from the full maxima present in one slot, and is spaced apart by at least 512 half chips from any local maximum.

10. The receiver of claim 7, wherein the mask includes a first window centered around a corresponding one of the local maximum peaks and having a width equal to about 32 half chips.

11. The receiver of claim 7, wherein the mask includes two stripes being symmetrically spaced apart from said corresponding local maximum peak, at a distance of about 254 half chips, and being about 4 half chips wide.

12. The receiver of claim 7, wherein the second threshold is set to a value of 2 dB to 4 dB below the magnitude of the local maximum.

13. A Universal Mobile Telecommunications System (UMTS) mobile station for a UMTS telecommunication network being operative to achieve slot synchronization of a Primary Synchronization Channel (P-SCH) sequence in the UMTS network, said receiver being configured to:

receive a P-SCH signal including a synchronization sequence;

perform a correlation of each received sample in the P-SCH signal with a known synchronization sequence in order to generate a correlation profile;

determine a level of noise of the correlation profile and compute a first threshold for the correlation profile;

suppress any peaks within said correlation profile having a magnitude less than the first threshold;

detect the persistent local maximum peaks over a period of N slots; and apply a predetermined mask positioned with respect to said persistent peaks and associated with at least one second threshold value distinctive from said first threshold, to eliminate any peaks that are less than the second threshold.

14. UMTS mobile station of claim 13, wherein the mask includes a first window centered around a corresponding one of the local maximum peaks and having a width equal to about 32 half chips.

15. UMTS mobile station of claim 13, wherein the mask includes two stripes being symmetrically spaced apart from said corresponding local maximum peak, at a distance of about 254 half chips, and being about 4 half chips wide.

* * * * *